United States Patent

[11] 3,602,651

[72] Inventor Ira Molay
Wenham, Mass.
[21] Appl. No. 823,850
[22] Filed May 12, 1969
[45] Patented Aug. 31, 1971
[73] Assignee Audiophonic Corporation
Beverly, Mass.

[54] RECORDING DEVICE FOR TAPE MOUNTED ON A CARD

5 Claims, 3 Drawing Figs.

[52] U.S. Cl. .......... 179/100.2MD, 235/61.11 D, 274/4 J
[51] Int. Cl. .......... G11b 19/00, G11b 25/04
[50] Field of Search .......... 179/100.2 Z, 100.2 T, 100.2 MI; 340/149 A, 174.1 H; 235/61.11 D; 35/35 C; 274/4 J, 4, 11

[56] References Cited
UNITED STATES PATENTS

| | | | |
|---|---|---|---|
| 2,603,006 | 7/1952 | MacChesney et al. | 35/35 C |
| 2,677,200 | 5/1954 | MacChesney | 35/35 C |
| 2,849,542 | 8/1958 | MacChesney | 109/100.2 |

*Primary Examiner*—Bernard Konick
*Assistant Examiner*—Alfred H. Eddleman
*Attorney*—Wolfe, Greenfield & Sacks

ABSTRACT: A magnetic tape recorder for a two-track magnetic tape extending longitudinally across the center of a rectangular card in which the recording and playback head is mounted in a channel closer to one edge of the channel than the other. By reversing the card in the channel, the same recording transcribing head can pickup both tracks of the tape. The present invention relates to a means for recording and transcribing on magnetic tapes mounted on rectangular sheets of finite length.

INVENTOR
IRA MOLAY
BY
Wolf, Greenfield, Hieken & Sacks

INVENTOR
IRA MOLAY
BY
Wolf, Greenfield, Hieken & Sacks

RECORDING DEVICE FOR TAPE MOUNTED ON A CARD

SUBJECT MATTER OF INVENTION

The present invention relates to a sound recording and transcribing apparatus.

BACKGROUND OF INVENTION

There is a need for improved inexpensive sound recording and transcribing devices for use in the teaching art. One important need involves the use of an improved means for recording and transcribing on multichannel magnetic tapes which are mounted on rectangular cards of finite length. Such card mounted tapes are extensively used as teaching aids, particularly in teaching phonetics, language, spelling and the like. Prior efforts to develop such arrangements are illustrated, for example in U.S. Letters Pat. No. 2,677,200 issued May 4, 1954, and U.S. Letters Pat. No. 2,603,006 issued July 15, 1962. These previous efforts have not been completely satisfactory and are limited in their utility and application.

SUMMARY OF INVENTION

It is therefore an object of the present invention to provide an improved recording and transcribing device for multichannel magnetic tapes mounted on rectangular cards in which the recording and transcribing device is rugged, inexpensive and simple to make. A further object of the present invention is to provide an improved transcribing recording device for multichannel magnetic tapes mounted on rectangular cards in which the cards are horizontally fed through a guide or channel without likelihood of skewing. One further object of the present invention is to provide a simple transcribing device having a minimum number of drive mechanisms which eliminates the need of pinch wheels and spring elements for guiding a card through the device. A further object of the present invention is to provide an improved means for feeding a card having a magnetic tape longitudinally mounted thereon in which the card is guided in a channel of recording and transcribing machine in such a manner as to preclude rubbing or abusive handling of the tape as it passes through the machine. A further object of the present invention is to provide an improved tape recording and transcribing machine having a permanent magnet adapted to erase and bias a tape mounted on a card with the permanent magnet controlled for operational movement by a lever common with a function switch. A further object of the present invention is to provide an improved tape recorder and playback device wherein tapes mounted longitudinally and symmetrically on a card can be played on both tracks of a two-track tape by simply reversing the card. Such an arrangement is attained by providing a recording-transcribing head offcenter with respect to the sides of the guiding channel. A further object of the present invention is to provide an improved drive means for a tape recorder and transcriber wherein a flywheel is journaled on a horizontal axis and is attached to a drive motor by a belt. A further object of the present invention is to provide a pair of commonly mounted drive wheels having a resilient surface adapted to engage one surface of a card and press it into engagement with a guide whereby a tape carried on the other side of the card engages a transcribing head in a fixed pressure relationship.

DETAILED DESCRIPTION OF DRAWINGS

These and other objects and advantages of the present invention will be more clearly understood when considered in conjunction with the accompanying drawings in which.

DETAILED DESCRIPTION OF PREFERRED EMBODIMENT

Figure 1:
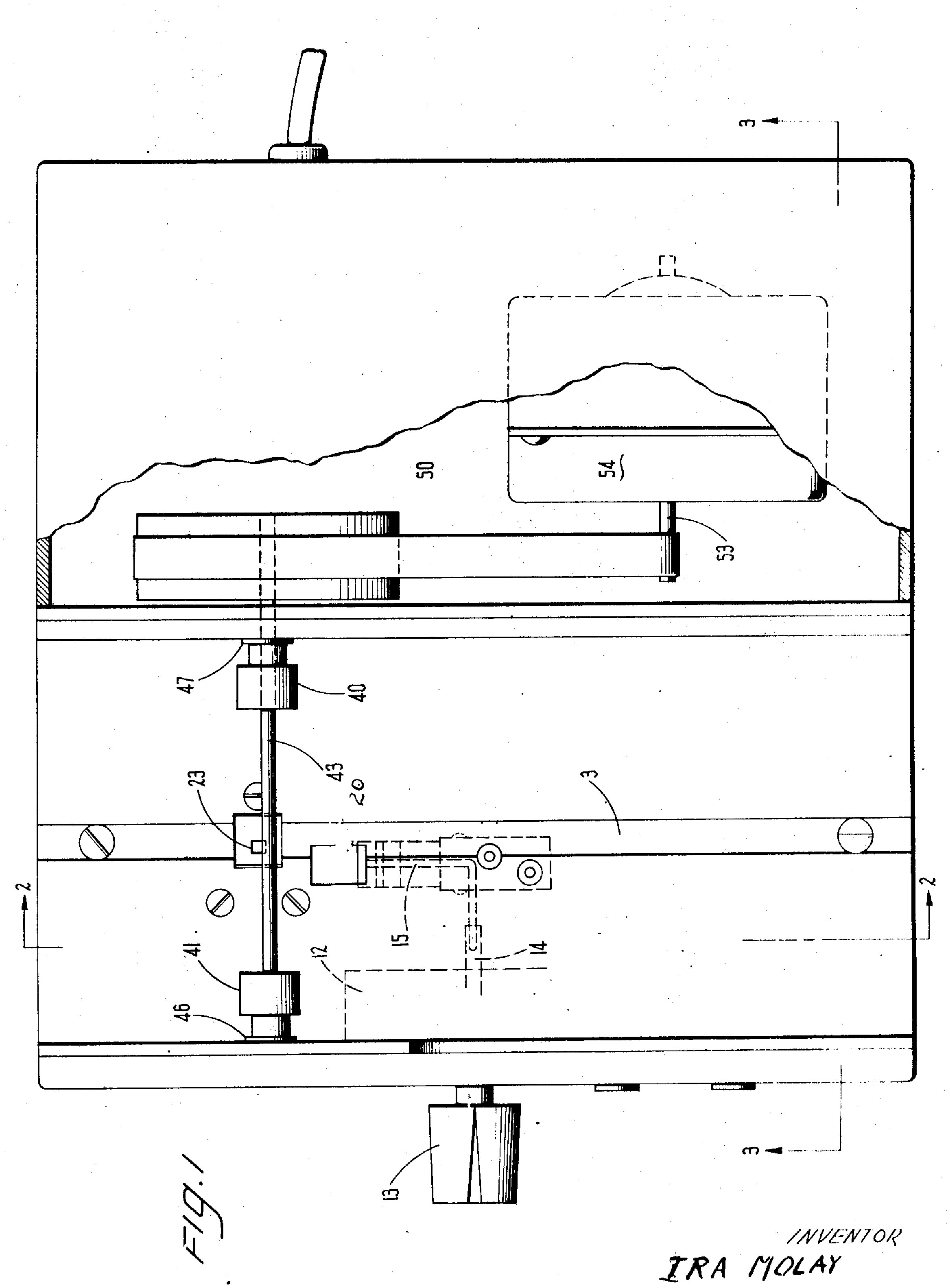
FIG. 1 is a partially fragmentary top view of a tape recorder embodying the present invention.

The recorder of the present invention is designed to play magnetic tape strips of approximately 5 to 7 inches in length that are mounted on rectangular cards. These cards are adapted to be moved lengthwise of the magnetic tape which is mounted on them. Conventionally, these magnetic tape strips are mounted parallel to and symmetrical with the side edges of the cardboard.

In the embodiment of the present invention, there is provided a horizontal member 1 normally designed to be supported by the frame of the machine. The frame of the machine provides a suitable enclosure means. A groove 3 extends lengthwise of the horizontal member 1 and has a width and depth designed to receive within it a magnetic tape strip mounted on a rectangular card when the magnetic tape is on the lower surface of the cardboard. This groove reduces wear on the tape strip as it is moved longitudinally on the horizontal member. A pair of side guides 4 and 5 are provided on the lateral sides of the horizontal member 1. These side guides 4 and 5 may comprise longitudinally extending walls that have inner surfaces 6 and 7 parallel with one another. These inner surfaces 6 and 7 are spaced at equal distances from the groove 3, thus defining an arrangement in which the groove 3 symmetrically divides the space between the two side guides 4 and 5. These side guides 4 and 5 and horizontal member 1 thus define an elongated channel 9 along which the tape card may be moved.

Figure 2:
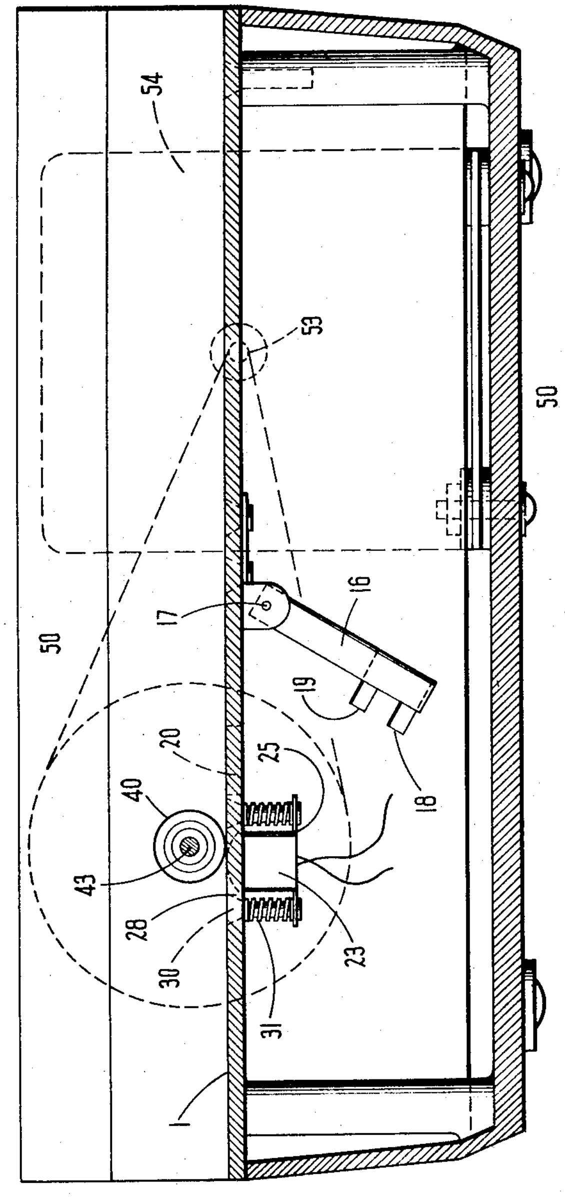
FIG. 2 is a cross-sectional view taken substantially along the line 2–2 of FIG. 1.
Figure 3:
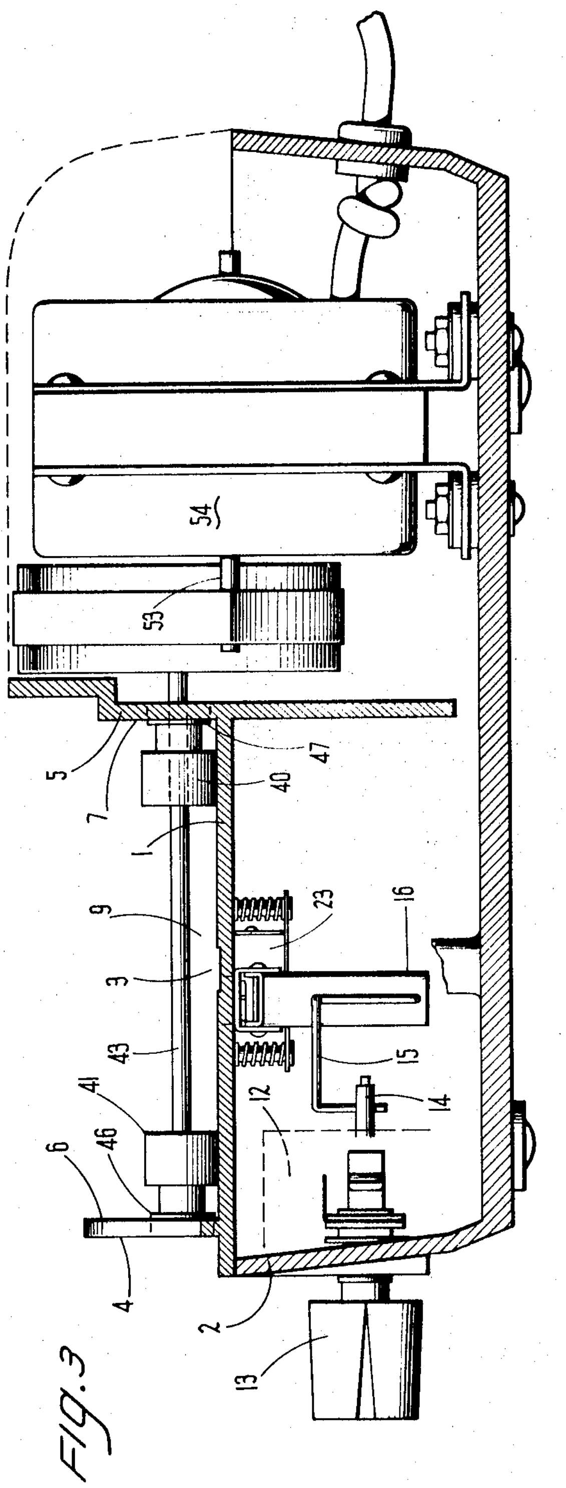
FIG. 3 is a cross-sectional view taken substantially along the line 3—3 of FIG. 1.

Preferably contained within the casing 2 of the recorder immediately below horizontal member 1 is a switch 12 controlled from the outside by a knob 13. The knob 13 is a multiposition knob with the positions including "off, record, and play." The switch 12 is connected to suitable circuit means for turning the machine to and from an "off" position, and when in an "on" position to either "play" or "record." The shaft 14 which extends from the switch 12 carries with a lever arm 15. This lever arm 15 comprises an angle member adapted to engage the lever arm 16. The lever arm 16 is pivotally secured at its upper end 17 to the under surface of the horizontal member 1. This lever 16 carries a horseshoe magnet having magnet ends 18 and 19 at its free end that are adapted to be pivoted upwardly through an opening 20 in the horizontal member 1. The opening 20 is located in the horizontal member 1, and extends laterally into groove 3 only the left side as viewed in FIG. 2. Thus, magnets 18 and 19 project through opening 20 to magnetically engage one-half side only of a tape being moved along the groove 3. Thus, only one-half side of tape on a card will be erased as it moves through the groove 3 with the permanent magnets 18 and 19 in an erase position. The knob 13 and the lever 14 and 15 are keyed to raise the magnets 18 and 19 to an erase position when the circuitry is in a "record" condition.

The transducer head 23 is suitably supported on a bracket 25, in turn screwed to the under surface of the horizontal member 1. The transducer head 23 projects upwardly through an aperture 28 in the horizontal member 1 and is designed to either transcribe or record lengthwise on one-half side of the magnetic tape as it is being moved in the channel 9. The transducer head 23 is located in longitudinal alignment with the permanent magnets 18 and 19 so that an erasure or a recording-playback take place only the left one-half side of the tape, as viewed in FIG. 1, as it is moved lengthwise in one direction through the elongated channel 9. The transducer head 23 is supported on a platform or bracket 25 by screws 30 with the bracket separated from the under surface of the horizontal member 1 by spring means 31, thus providing a means for adjusting the position of the transducer head 23 in the aperture 28 of horizontal member 1.

The rectangular card bearing the tape is moved over the upper surface of horizontal member 1 with its leading edge inserted under the drive rolls 40 and 41. These drive rolls 40 and 41 are longitudinally positioned preferably between the permanent magnet aperture 20 and are preferably located substantially over the transducer head 23. The drive rolls 40, 41 are preferably made of a resilient rubber material and are suitably keyed to a shaft 43. The shaft 43 in turn is suitably supported by journaling means 46 between the longitudinally extending walls forming the side guides 4 and 5. The shaft 43 is journaled at a distance above the upper surface of the horizontal member 1 sufficient so that the drive rolls 40, 41 are substantially tangenial with the upper surface and are adapted to frictionally engage the upper surface of a card placed on the upper surface of the horizontal member 1. The drive rolls 40, 41 are driven in a clockwise direction, as viewed in FIG. 2, by a flywheel 50 that is keyed to the end of the shaft 43 that extends into the frame or housing of the tape recorder. This flywheel in turn is driven by a belt of suitable material such as rubber or the like that is endlessly looped about the shaft 53 of the motor 54. The drive rolls 40, 41 preferably are symmetrically spaced on the shaft 43 on either side of the elongated groove 3.

The electronic circuitry utilized does not form part of this invention and may include any suitable circuitry in which the knob 13 controls switch means that switches electrical circuitry controlling the transducer head 23 from "off" to "play" or "record" conditions. When the switch is turned to a "record" position, the motor 54 is turned on, thus causing the flywheel 50 to turn, which in turn causes rotation of the drive roll 40, 41 in a clockwise direction, as viewed in FIG. 2. A card of the type described may thus be placed with its leading edge under the drive rolls 40, 41 and be drawn under these drive rolls 40, 41. At the same time motor 54 is turned on, the lever 15 pivots the lever arm 16 upwardly, thus causing the magnets 18 and 19 to project through the opening 20 and magnetically engage left one-half of the magnetic tape, as viewed in FIG. 1, which side is closest to the side guide 4. The card is driven entirely under and past the drive rolls 40, 41 where it may be removed by hand by an operator.

When the knob 13 is turned to a "playback" position, the motor 54 is turned on and the transducer is suitably activated. The lever 15, however, does not engage the lever means 16, and thus does not cause the magnets 18 and 19 to be moved to an erase position.

In order to insure that worn or frayed cards are maintained in close contact with the head as they pass over it for the best possible recording and playback characteristics, a spring guide may be used. This guide would comprise a shaft mounted parallel to shaft 43 and extending between the longitudinally extending walls forming the side guides 4 and 5. A leaf spring is fixed at one end to this shaft which is located in an area generally over the opening 20. The other end of the leaf spring extends under shaft 43 and over the tape head 23 with its free end adapted to engage the upper surface of the cards as they are moved along the guide to press the card and the tape against the tape head.

I claim:

1. A magnetic tape player for a card mounted magnetic tape of finite length extending symmetrically with respect to the side edges of said card comprising, means forming a channel having parallel side guides spaced apart a distance to receive and guide said card with the sides of the card engaging said side guides as said card is moved in a direction lengthwise of said magnetic tape mounted thereon, a transducer head, and means supporting said head for operative engagement with said tape, with said head located closer to one of said side guides than the other whereby an elongated portion of said tape bordering one edge thereof is operatively engaged by said head while a parallel portion of said tape adjacent to the other edge thereof is not operatively engaged by said head as said card is moved through said channel, wherein said means forming a channel includes a horizontal member and said side guides comprise longitudinally extending walls projecting upwardly from the horizontal member, said horizontal member and longitudinally extending walls defining said channel, wherein said transducer head projects upwardly through said horizontal member, including at least one drive roll, means supporting said drive roll above said horizontal member for rotation on an axis parallel thereto, and means for rotating said drive roll whereby a card in said channel may be engaged by said drive roll and moved over said transducer head, including an elongated groove formed in the upper surface of said horizontal member symmetrical with respect to said side guides and nonsymmetrical with respect to said transducer head, said groove having a width to receive within the edges thereof said tape.

2. A magnetic tape player as set forth in claim 1, including a permanent magnet for erasing and biasing said tape, means supporting said magnet for movement to and from a position adjacent said groove in operative relation with a tape passing through said groove.

3. A magnetic tape player as set forth in claim 2 wherein said means supporting said magnet comprises a lever means and a control knob for swinging said lever, said control knob including means for switching electrical circuitry associated with said tape player to a record condition.

4. A magnetic tape player as set forth in claim 1, including a pair of said drive rolls, said means supporting said drive rolls comprising a shaft journaled above said horizontal member with said drive rolls positioned laterally on opposite sides of said transducer.

5. A magnetic tape player as set forth in claim 4, including a flywheel axially keyed to said shaft, a motor drive having a second shaft and an endless belt interengaging said two shafts.